Figure 1:
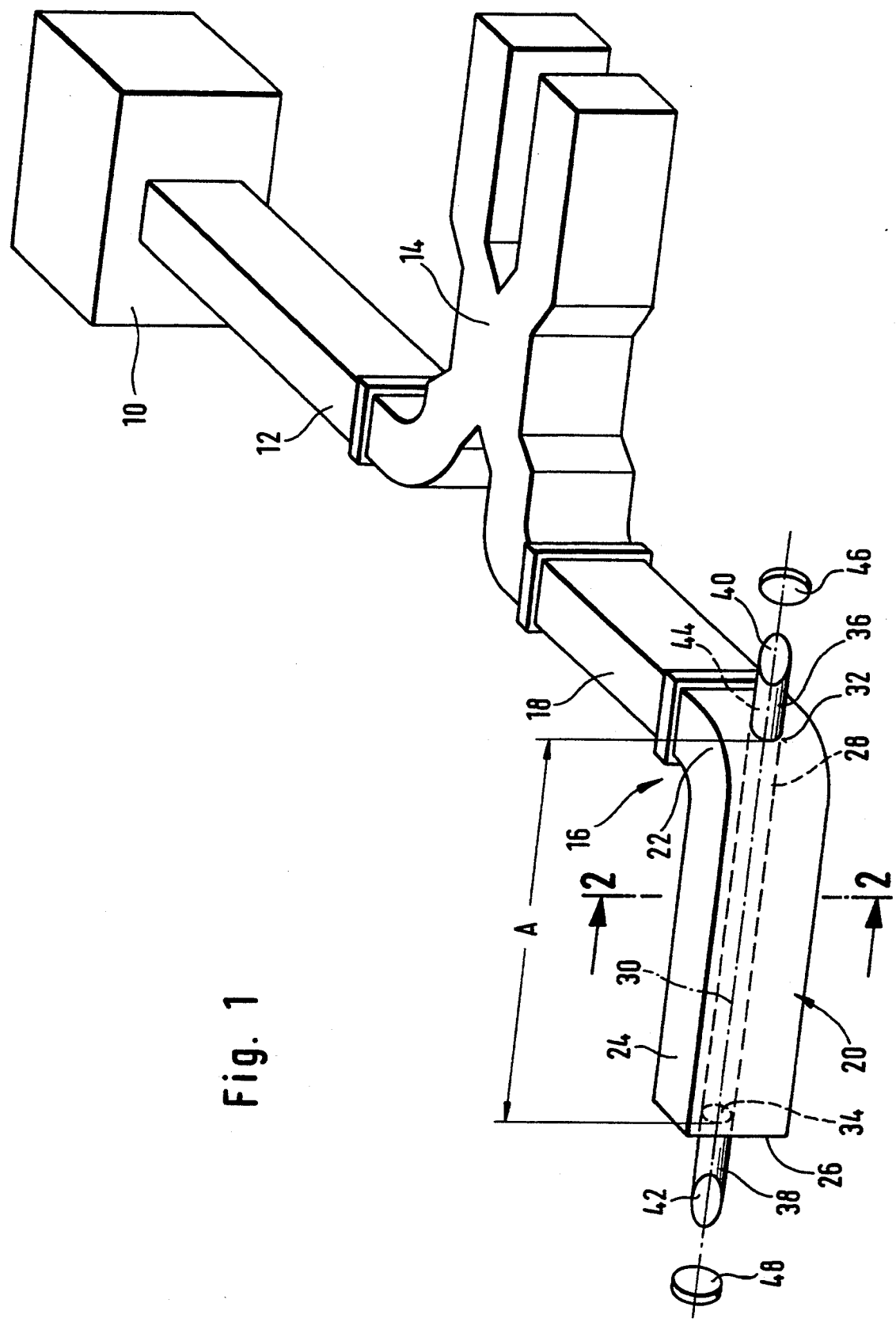

United States Patent [19]
Gekat et al.

[11] Patent Number: 5,347,530
[45] Date of Patent: Sep. 13, 1994

[54] PULSED GAS-DISCHARGE LASER SYSTEM

[75] Inventors: Frank Gekat, Korb; Hans Klingenberg, Tuebingen; Gerhard Krutina, Ludwigsburg, all of Fed. Rep. of Germany

[73] Assignee: Deutsche Forschungsanstalt fuer Luft- und Raumfahrt e.V., Bonn, Fed. Rep. of Germany

[21] Appl. No.: 958,336
[22] PCT Filed: Apr. 9, 1992
[86] PCT No.: PCT/EP92/00808
§ 371 Date: Feb. 11, 1993
§ 102(e) Date: Feb. 11, 1993
[87] PCT Pub. No.: WO92/19028
PCT Pub. Date: Oct. 29, 1992

[30] Foreign Application Priority Data
Apr. 20, 1991 [DE] Fed. Rep. of Germany ....... 4112946

[51] Int. Cl.$^5$ .............................................. H01S 3/097
[52] U.S. Cl. ......................................... 372/82; 372/57
[58] Field of Search ....................... 372/82, 57, 69, 84, 372/86, 70

[56] References Cited

U.S. PATENT DOCUMENTS

| | | | |
|---|---|---|---|
| 4,513,424 | 4/1985 | Waynant et al. | |
| 4,710,939 | 12/1987 | Birnbach et al. | 372/57 |
| 4,796,271 | 1/1989 | Christensen et al. | 372/57 |
| 4,802,183 | 1/1989 | Harris et al. | |
| 4,862,886 | 9/1989 | Clarke et al. | 372/57 |
| 4,955,035 | 9/1990 | Gekat. | |

FOREIGN PATENT DOCUMENTS 4008195 9/1991 Fed. Rep. of Germany.

OTHER PUBLICATIONS

Klingenberg et al., "L-band Microwave Pumped XeCL Laser Without Preionization," *Applied Optics*, vol. 29, No. 9, Mar., 1990, pp. 1246–1248.
Klingenberg et al., "Microwave Excitation of Excimer Lasers," *Laser Und Optoelecktronik*, vol. 22, No. 4, Aug. 1990, pp. 60–62.
Christensen et al., "High Efficiency Microwave Discharge XeCL Laser," *Appl. Phys. Lett.*, vol. 46, No. 4, Feb., 1985, pp. 321–323.
Wisoff et al., "Improved Performance of the Microwave Pumped XeCL Laser," *IEEE J. Quantum Electron*, vol. OE-18, No. 11, Nov. 1982, pp. 1839–1840.
Patent Abstracts of Japan, 63-90290, vol. 14, No. 22, Jan. 17, 1990.
Patent Abstracts of Japan, 63-191736, vol. 14, No. 194, Apr. 20, 1990.

*Primary Examiner*—Rodney B. Bovernick
*Assistant Examiner*—Robert E. Wise
*Attorney, Agent, or Firm*—Barry R. Lipsitz

[57] ABSTRACT

To provide a pulsed gas-discharge laser system, in particular a pulsed excimer laser system, comprising a resonator and a gas volume filled with laser gas in which a gas discharge is ignitable, a microwave discharge structure surrounding the gas volume at least partially for maintaining the gas discharge, a microwave source for generating a microwave pulse and a microwave line leading from the microwave source to the microwave discharge structure, in which the laser pulse power behaves overproportionally to the pumping power, it is proposed that there be coupled to the microwave line by a coupling element a resonant microwave storage structure which leads to the gas volume and extends with at least a partial section thereof between the microwave discharge structure and the microwave line, and that the microwave storage structure be of such design and coupled to the microwave line by the coupling element in such a way that it stores the energy from the microwave pulse emitted by the microwave source until the ignition of the gas discharge and after the ignition of the gas discharge maintains the latter with the stored energy.

19 Claims, 6 Drawing Sheets

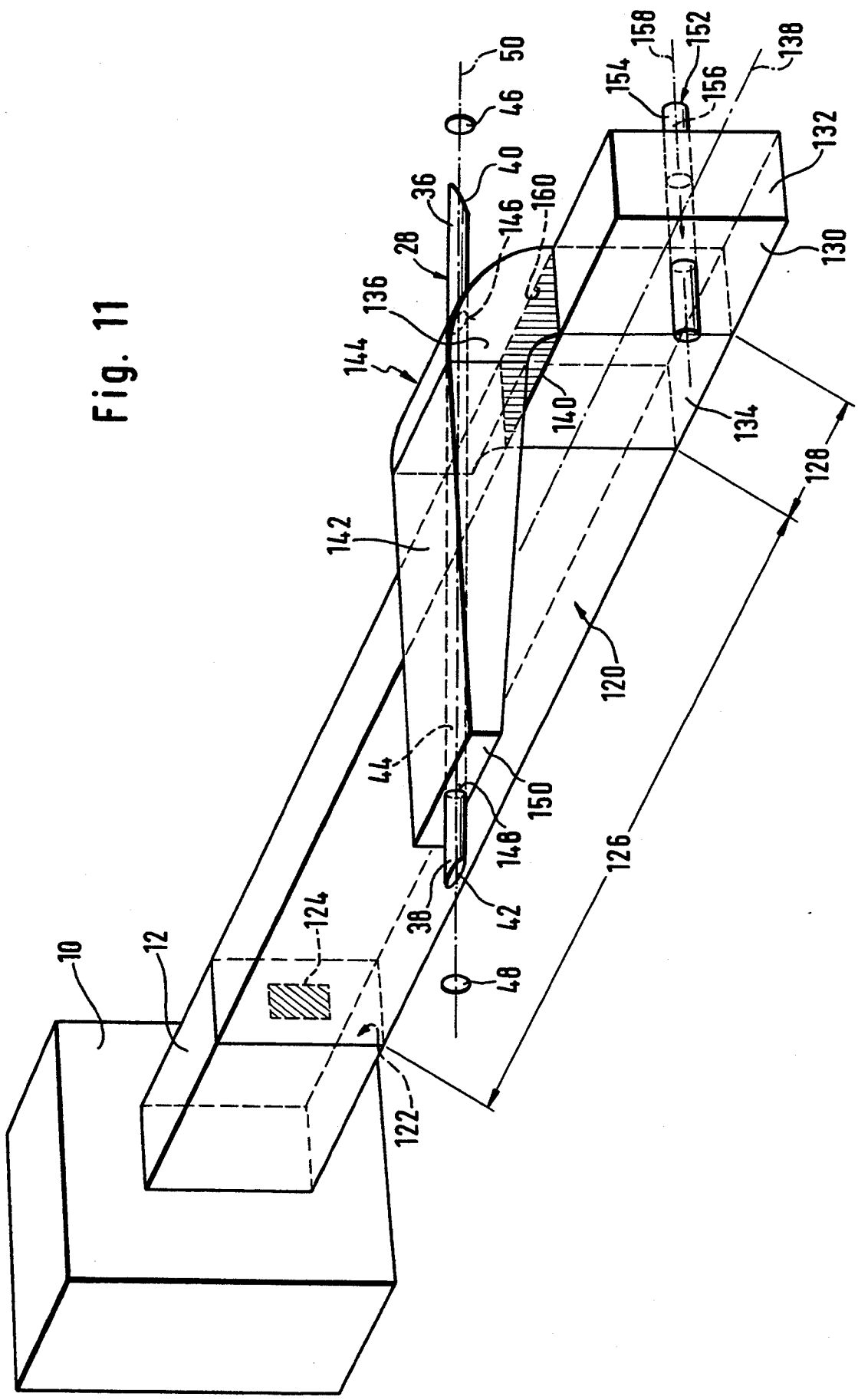

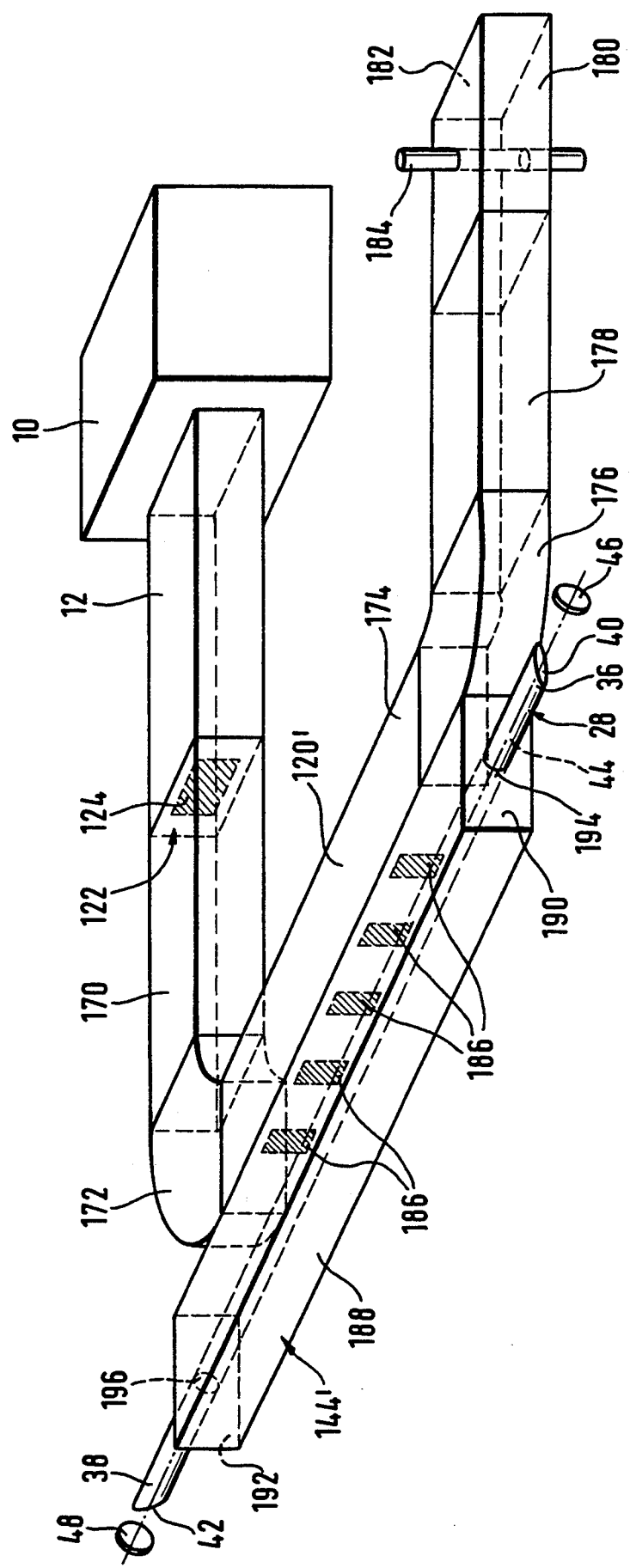

PULSED GAS-DISCHARGE LASER SYSTEM

The invention relates to a pulsed gas-discharge laser system, in particular a pulsed excimer laser system, comprising a resonator and a gas volume filled with laser gas in which a gas discharge is ignitable, a microwave discharge structure surrounding the gas volume at least partially for maintaining the gas discharge, a microwave source for generating a microwave pulse and a microwave line leading from the microwave source to the microwave discharge structure.

In these pulsed gas-discharge laser systems known, for example, from U.S. Pat. No. 4,802,183, the achievable laser pulse power is proportional to the microwave pumping power. For this reason, pulsed, microwave-pumped gas-discharge laser systems have so far been unable to achieve high powers.

The object underlying the invention is, therefore, to provide a microwave-pumped, pulsed gas-discharge laser system in which the laser pulse power behaves over-proportionally to the pumping power.

This object is accomplished in accordance with the invention with a pulsed gas-discharge laser system of the kind described at the beginning by there being coupled to the microwave line by a coupling element a resonant microwave storage structure which leads to the gas volume and extends with at least a partial section thereof between the microwave discharge structure and the microwave line, and by the microwave storage structure being of such design and coupled to the microwave line by the coupling element in such a way that it stores the energy from the microwave pulse emitted by the microwave source until the ignition of the gas discharge and after the ignition of the gas discharge maintains the latter with the stored energy.

The advantage of the present invention is to be seen in the fact that the microwave pulse can as it were be "compressed" and a power is thus available for the maintenance of the gas discharge which lies above the power of the microwave pulse of the microwave source by a factor of from approximately 10 to approximately 1000. Therefore, laser pulse powers which are comparable with TEA pumped lasers are achievable with conventional microwave sources.

To protect the microwave source, it has proven particularly advantageous for the microwave storage structure to be of such design and coupled to the microwave line by the coupling element in such a way that after the ignition of the gas discharge it couples back into the microwave line at most a microwave power which is double the microwave power of the microwave pulse. This means that in the present invention it is not a matter of coupling the microwave storage structure to the microwave line by the coupling element in such an optimum way that as much power as possible is stored in the microwave storage structure when the gas discharge is not ignited, but also of designing and coupling the microwave storage structure by the coupling element in such a way that when the gas discharge is ignited, the microwave power coupled back into the microwave line does not destroy the microwave source.

It is even more advantageous for the microwave storage structure to couple into the microwave line, after the ignition of the gas discharge, at most a microwave power which is 1.5 times the microwave power of the microwave pulse, and it is particularly advantageous for the coupled-back microwave power to correspond at most to the microwave power of the microwave pulse.

To achieve optimum coupling in the microwave discharge structure for maintenance of the gas discharge, provision is advantageously made for an electric field vector of the microwaves in the microwave discharge structure to stand perpendicular on an optical axis of the resonator. In this way, in particular, the coupling of the microwaves to the gas discharge can be optimized.

Furthermore, in order to achieve advantageous coupling of the microwaves for maintenance of the gas discharge, it is expedient for the region of the gas volume penetrated by the electric field in the microwave discharge structure to extend in the direction of the optical axis of the resonator which is at least 1.5 times the cut-off wavelength of the microwave discharge structure because this measure results in a particularly advantageous way in high powers in the pulsed gas-discharge laser system according to the invention.

For the duration of the gas discharge in the pulsed gas-discharge laser system according to the invention to be sufficient, provision is, furthermore, advantageously made for the microwave storage structure to have a length which is approximately half of the path covered by the microwaves during the duration of the laser pulse so that it is possible to use the entire microwave energy stored in the microwave storage structure for generating the laser pulse.

To obtain as few losses as possible, it is particularly advantageous for the microwave storage structure to be of dielectric-free design. For example, a dielectric-free microwave storage structure is a waveguide structure, i.e., the entire microwave storage structure is built up of waveguide elements.

Furthermore, it is advantageous for the microwave discharge structure to be a waveguide structure as it is then easily adaptable to the microwave storage structure.

In one kind of advantageous embodiment, provision is made for the microwave storage structure to comprise a storage line and a microwave discharge structure, i.e., for the microwave discharge structure to form together with the storage line a resonant structure in which storage of microwave energy is possible.

In this case, both the storage line and the microwave discharge structure are advantageously made up of waveguide elements.

In the present invention, the microwave storage structure can be built up in different ways. Accordingly, provision is made in one advantageous alternative for the microwave storage structure to be an elongate, resonant structure and, in particular, this elongate, resonant structure can include bends and be advantageously terminated by a short-circuit plate.

In a further alternative, provision is made for the microwave storage structure to be a closed, ring-resonant structure, i.e., for the microwave storage structure to be built up in the fashion of a ring resonator in which a standing wave field forms.

In the description of the embodiments so far, no details were given about the way in which the gas discharge is ignited. In the simplest embodiment according to the invention, provision is made for the ignition of the gas discharge in the gas volume to take place by self-ignition, i.e., for microwave energy to be stored in the microwave storage structure until the field strength of the standing wave field present in the microwave storage structure is of such size that ignition of the gas discharge is initiated in the gas volume. Subsequently, essentially all of the stored microwave energy is coupled into the gas volume.

As an alternative to this, provision is made for the ignition of the gas discharge to occur by preionization. The preionization has the advantage that a defined point in time can be aimed at and so after a duration of the microwave pulse and after a certain storing of its microwave energy in the microwave storage structure, the ignition of the gas discharge can be initiated in a defined manner by the preionization and a defined point of ignition can thus be achieved for the gas discharge independently of pressure and temperature fluctuations in the gas volume.

There are many different possibilities for the ignition of the gas discharge by preionization. One possibility is for the preionization to occur by means of an electric field, in particular a high-frequency field.

The preionization is preferably carried out in such a way that it occurs by way of an electric field transversely to the optical axis, with this electric field preferably being aligned parallel to the electric field of the coupled microwave energy.

As an alternative to this it is, however, also possible for the preionization to occur by way of an electric field in the direction of the optical axis.

In principle, the electric field can be a constant field. It is, however, particularly advantageous for the preionization to occur by way of an electric high-frequency field and this high-frequency field will preferably also be generated by an additional microwave discharge.

It is, furthermore, conceivable within the scope of the present invention for the electric field to be generated by electromagnetic radiation.

A further alternative for the preionization consists in this being carried out optically, in which case, the laser gas is irradiated with radiation which ionizes it as effectively as possible. UV radiation is, for example, used here, but other ionizing radiation, for example, X-ray or gamma radiation is also advantageous.

The preionization can be carried out in different parts of the gas volume. Accordingly, in one embodiment provision is made for the preionization to take place within the microwave discharge structure in order to achieve an ignition of the gas discharge which is as uniform as possible. In this case, if an electric field is used for the preionization, it is advantageous for this electric field to be aligned parallel to the electric field of the stored microwave energy coupled via the microwave discharge structure.

In a further advantageous embodiment of the present invention provision is made for the preionization to take place outside of the microwave discharge structure. This has the advantage that the conditions in the microwave discharge structure and hence also the coupling of the stored microwave energy into the gas volume are not disturbed. In this case, it is expedient for preionization to take place in a partial region of the gas volume located outside of the microwave discharge structure.

In a further advantageous embodiment, provision is made within the scope of the present invention for the microwave storage structure to comprise a storage waveguide which is coupled to the microwave line and to which the microwave discharge structure can be coupled via a switch element. This means that in this case the microwave storage structure and the microwave discharge structure are entirely separate from one another and microwave energy is first stored in the microwave storage structure and is only coupled into the microwave discharge structure after actuation of the switch element. In particular, this has the advantage that the microwave discharge structure does not have to be taken into account in the resonant conditions which are necessary for the microwave storage structure and the further advantage that a defined ignition of the laser gas is achievable via the switch element.

In this embodiment, too, the microwave storage structure and the microwave discharge structure together with the coupling element are preferably tuned to one another in such a way that when the switch element is switched on the microwave storage structure couples back into the microwave line at most a microwave power which corresponds to twice, preferably 1.5 times, or even better, to the microwave power of the microwave pulse coming from the microwave source.

The switch element preferably comprises an H-T element which, in particular, has a switch waveguide with a switch associated with it.

The switch is preferably a triggered or self-triggered high- or low-pressure gas-discharge switch, i.e., the switch contains a gas volume in which a gas discharge has to be ignited for the switching. The gas discharge can either ignite automatically when a sufficiently large amount of energy is stored in the microwave storage structure or it can, for example, be ignited in the same way as described hereinabove by preionization. As an alternative to this, an electron beam is, however, also possible as a switch.

In any case, the switching of the switch results in displacement of the standing wave field in the microwave storage structure by a quarter of the waveguide wavelength and thus in coupling of the microwave discharge structure which is connected to a gate of the H-T element via the H-T element.

In particular, in such an embodiment the microwave discharge structure may be constructed in such a way that it has a shape which generates an essentially constant electric field in the gas volume.

In the simplest case, such a microwave discharge structure is constructed in such a way that it has in the region of the gas volume penetrating it wall regions which taper as the distance from the storage waveguide increases.

Further features and advantages of the invention are the subject matter of the following description and the drawings of several embodiments.

Figure 2:
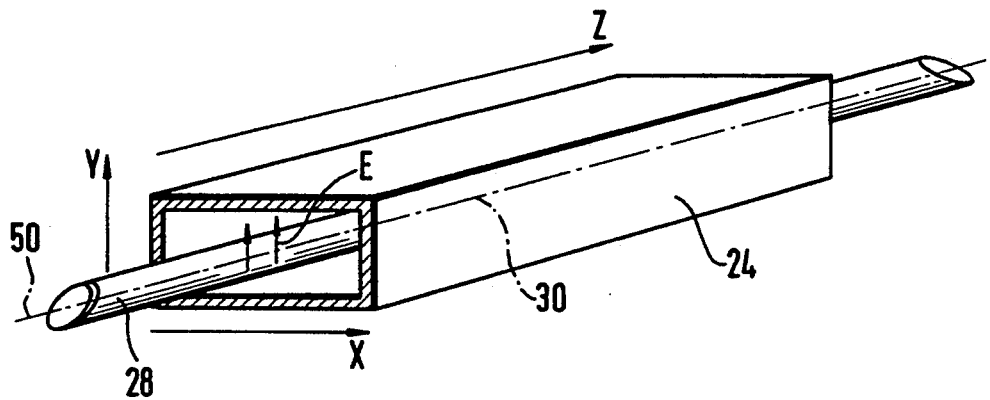
Figure 3:
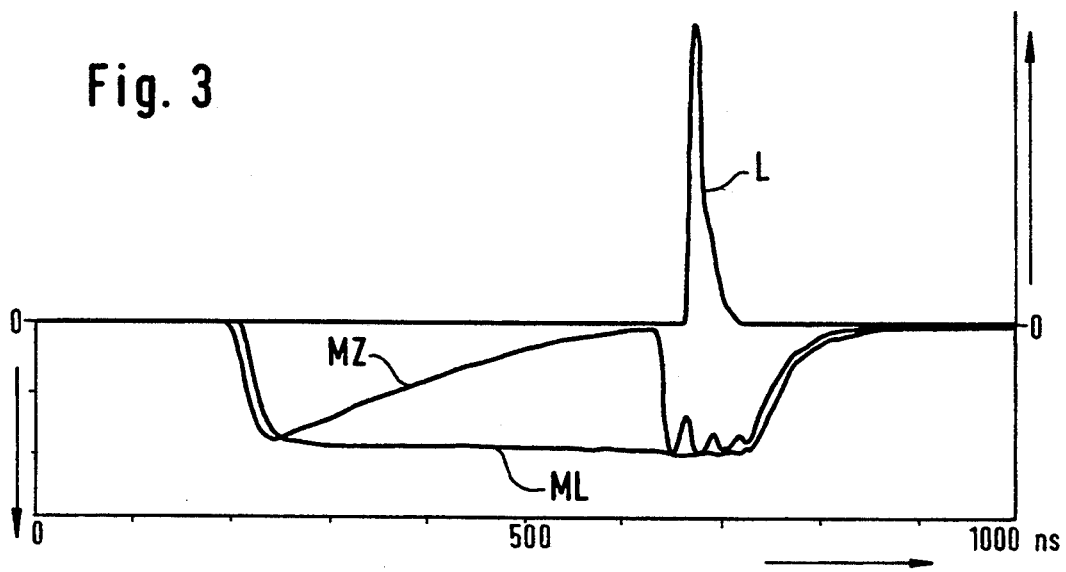
Figure 4:
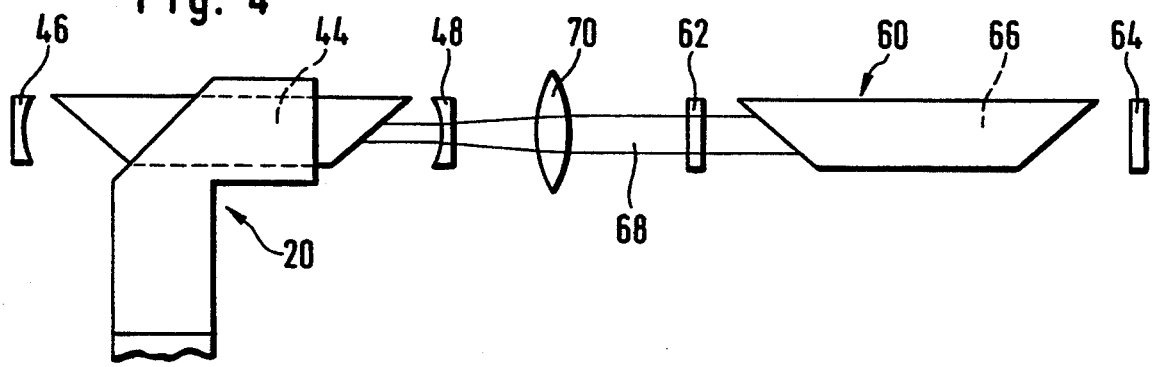
Figure 5:
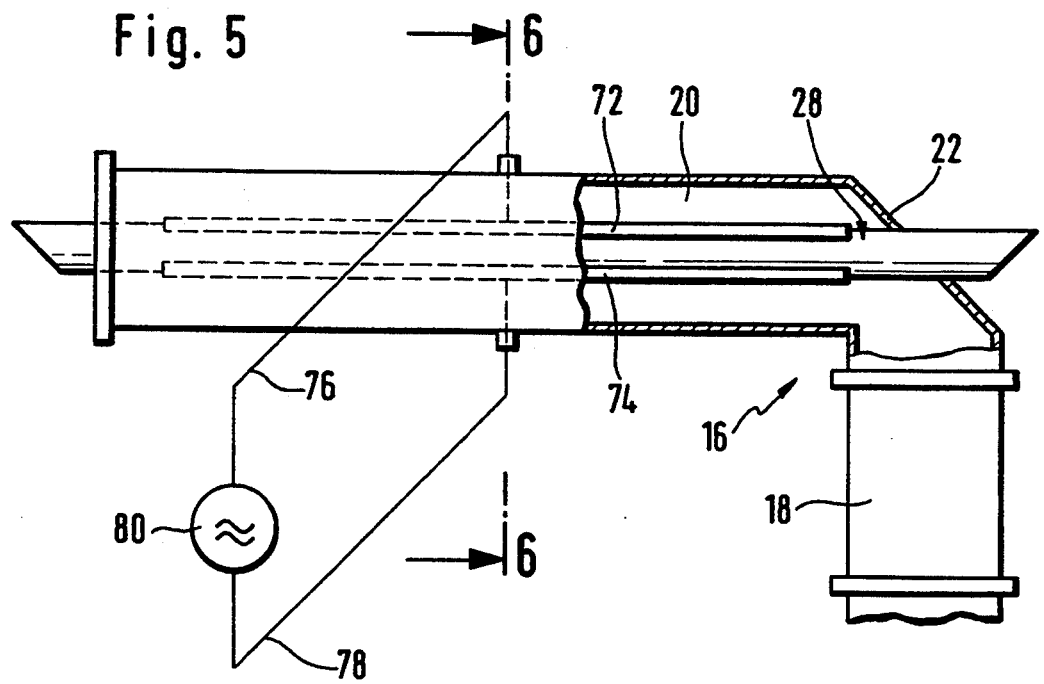
Figure 6:
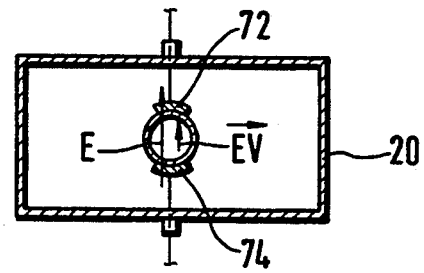
Figure 7:
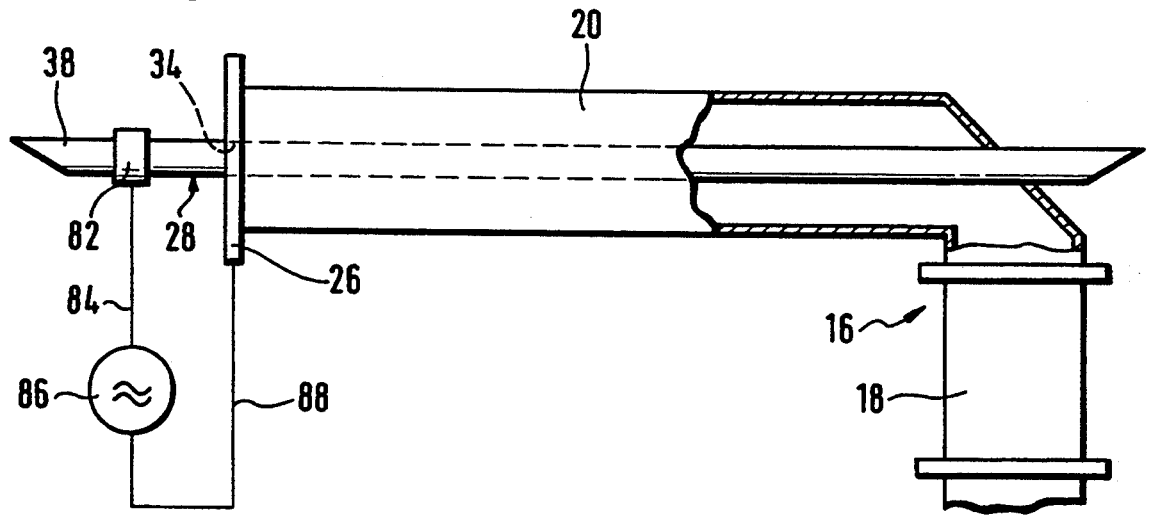
Figure 8:
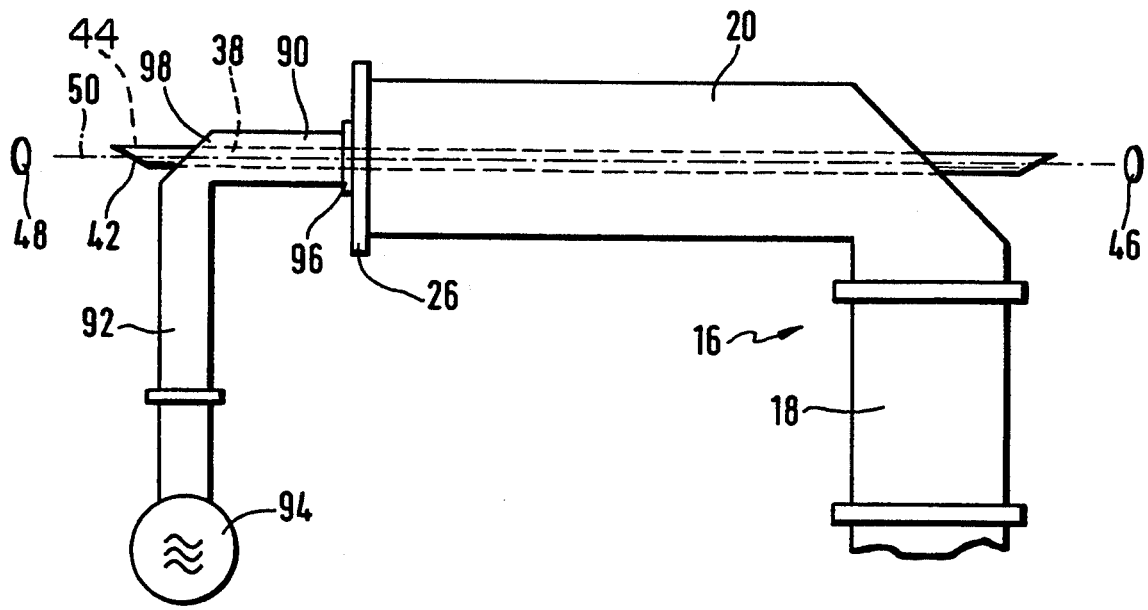
Figure 9:
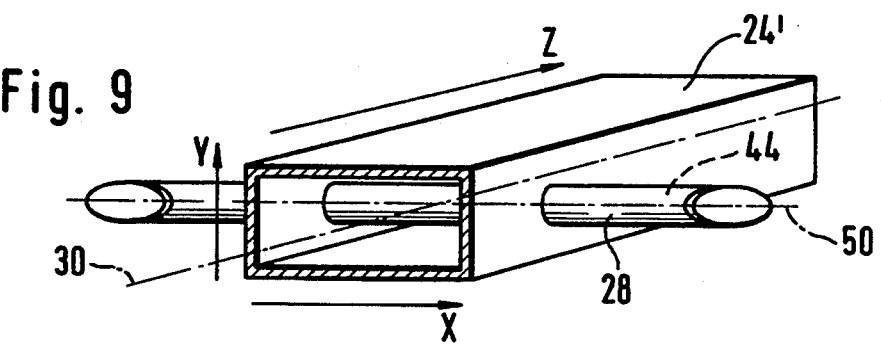
Figure 10:
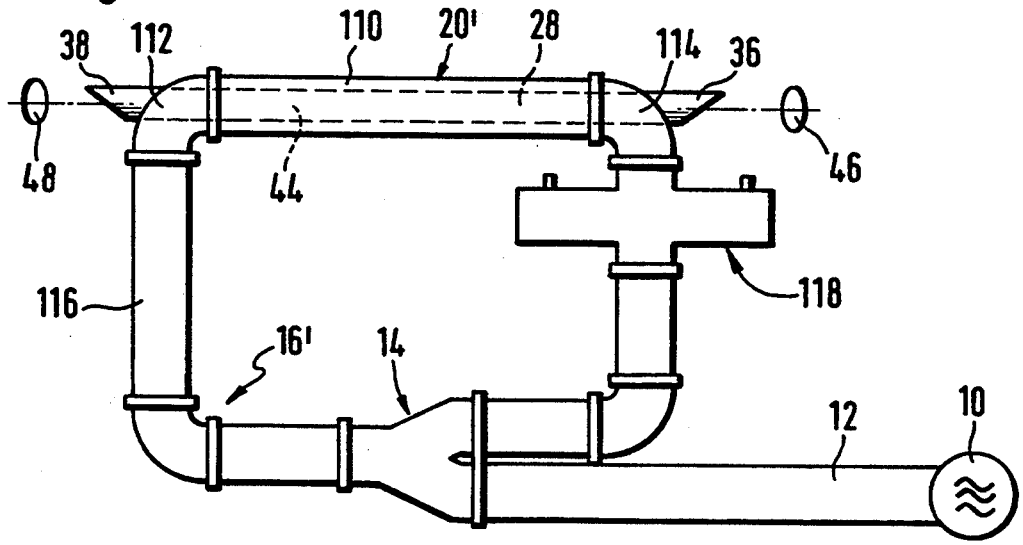

The drawings show:

FIG. 1 a perspective illustration of a first embodiment;

FIG. 2 a section along line 2—2 in FIG. 1;

FIG. 3 a diagram of the microwave power ML coming from the microwave source, the microwave power MZ coupled back to the microwave source and the laser pulse L with respect to time;

FIG. 4 a schematic, partial illustration of a second embodiment;

FIG. 5 a schematic, partial illustration of a third embodiment;

FIG. 6 a cross-section through the third embodiment along line 6—6 in FIG. 5;

FIG. 7 a schematic, partial illustration of a fourth embodiment;

FIG. 8 a schematic, partial illustration of a fifth embodiment;

FIG. 9 a sectional illustration similar to FIG. 2 through a sixth embodiment;

FIG. 10 a schematic illustration of a seventh embodiment with waveguides illustrated by a line only;

FIG. 11 a perspective illustration of an eighth embodiment; and

FIG. 12 a perspective illustration of a ninth embodiment.

A first embodiment of a pulsed gas-discharge laser system, illustrated in FIG. 1, comprises a microwave source 10 from which a microwave line 12 leads to a coupling element 14 which in this case is designed as a double-stub line and establishes a coupling between the microwave line 12 and a microwave storage structure generally designated 16. This microwave storage structure 16 comprises, on the one hand, a storage line 18 connected directly to the double-stub line 14 and a microwave discharge structure 20 connected to the storage line 18.

The storage line 18 is designed as a storage waveguide and the microwave discharge structure 20 likewise as a waveguide which has a 90° bend 22 adjoining the storage waveguide. A coupling waveguide 14 is also connected to the 90° bend 22 which is terminated at its end opposite the 90° bend 22 by a short-circuit plate 26.

The microwave discharge structure 20 is penetrated by a gas-discharge pipe 28 which extends parallel and preferably coaxially to a longitudinal axis 30 of the coupling waveguide 24. In gas-discharge pipe 28 issues from the microwave discharge structure 20 at one end through an opening 32 in the region of the 90° bend 22 and at the other end through an opening 34 in the short-circuit plate 26. A first end 36 of the gas-discharge pipe 28 projects from the opening 32 and a second end 38 projects from the opening 34 beyond the microwave discharge structure 20. The gas-discharge pipe 28 carries a first Brewster window 40 to close off the first end 36 and a second Brewster window 42 to close off the second end 38 so that the gas-discharge pipe 28 contains a closed-off gas volume 44 in which the laser gas, preferably an excimer laser gas such as, for example, XeCl, is present.

The gas-discharge pipe 28 is arranged in its entirety in a laser resonator which is formed by a first resonator mirror 46 opposite the first Brewster window 40 and by a second resonator mirror 48 opposite the second Brewster window 42. One of the resonator mirrors 46, 48 is a partially transmitting mirror from which the laser radiation issues.

The arrangement of the gas-discharge pipe 28 relative to the coupling waveguide 24 is shown again on an enlarged scale in FIG. 2 with the X- and Y-directions of the waveguide and the direction in which an $H_{10}$ wave runs through this waveguide indicated therein. As shown in FIG. 2, an optical axis 50 of the resonator preferably coincides with an axis of the discharge pipe. The optical axis 50 also coincides with the longitudinal axis 30 of the coupling waveguide 24 and the direction in which the $H_{10}$ wave runs likewise lies parallel to the longitudinal axis 30.

As the vectors of the electric field E in such a waveguide stand parallel to the Y-direction, the electric field E preferably occurring at the center of the waveguide extends perpendicular to the optical axis of the coupling waveguide 24. Therefore, the entire region of the gas volume 44 lying within the microwave discharge structure 20 is penetrated by an electric field E standing perpendicular on the optical axis 50. To achieve adequate coupling of the microwave energy into the gas volume 44 lying inside the microwave discharge structure 20, an extent A of the gas volume 44 penetrated by the electric field E in the direction of the optical axis 50 is preferably selected such that it amounts to at least 1.5 times the cut-off wavelength of the microwave discharge structure 20.

The way in which the first embodiment illustrated in FIGS. 1 and 2 of a pulsed gas-discharge system operates is illustrated schematically in FIG. 3. FIG. 3 shows, on the one hand, the course of the microwave power ML emitted by the microwave source 10 and representing a pulse with a pulse width of approximately 500 nanoseconds. Also indicated in FIG. 3 is the microwave power MZ which is coupled back from the microwave discharge structure 20 and the coupling element 14. At the start of the microwave pulse, MZ rises with the microwave power ML in the same way as the latter, but owing to the increasing storage of microwave energy in the microwave storage structure 16, MZ drops to almost zero thereafter. Therefore, the size of the electric field in the microwave discharge structure simultaneously increases to a corresponding extent as there is formed in the latter a standing wave in which the magnitude of the vector of the electric field E increases as the energy stored in this standing wave increases. On reaching a sufficiently high electric field strength E, self-ignition of the laser gas contained in the gas volume 44 occurs and so the laser pulse L is formed in the resonator comprised of the mirrors 46 and 48. Upon ignition of the laser gas in the gas volume 44, a mismatching occurs because the microwave discharge structure 20 no longer matches the coupling element 14 and thus the coupled-back microwave power MZ likewise increases up to values which correspond to the microwave power ML of the microwave pulse generated by the microwave source 10. Preferably, the coupling aperture 14 is selected in conformance with the microwave discharge structure 20 such that the microwave power MZ which is coupled back upon ignition of the laser gas in the gas volume 44 does not exceed the microwave power ML of the laser pulse generated by the microwave source so that no damage is done to the microwave source 10.

The length of the microwave storage stucture 16, which in this embodiment comprises of the storage waveguide 18 and the microwave discharge structure 20, is preferably selected such that it is approximately half of the path travelled by the microwaves during the duration of the laser pulse.

In the embodiment described, all of the waveguide elements may consist of materials with a high conductivity in order to obtain high resonator quality in the microwave storage structure 16 and hence high storable microwave energy. Another possibility are waveguides with a conductive inside coating, and waveguides with a superconductive coating or superconductive waveguides are also used in variants of the present invention.

In particular, the microwave storage structure 16 made up of waveguides is free from any dielectric elements, with the exception of the gas volume of the laser gas, and in a particularly preferred embodiment can be evacuated or filled with an insulation gas under pressure in order to increase the electric strength and thus further increase the storable energy.

In the first embodiment described hereinabove, the laser gas in the gas volume 44 ignites automatically owing to the size of the vector E of the electric field when a sufficiently large amount of energy is stored, and it is possible to set the energy at which the ignition of the laser gas takes place in the gas volume 44 via the pressure and the temperature of this gas.

Such a structure with self-igniting laser gas represents the simplest form of the present invention, but the point in time at which the laser gas ignites in the gas volume 44 cannot be fixed exactly.

For this reason a second embodiment, illustrated in FIG. 4, makes provision for the laser gas present in the gas volume not to ignite automatically, but to be irradiated by a preionization radiation source generally designated 60. The laser gas is preionized so that a gas discharge is initiated in the gas volume 44 even though the electric field of the energy stored in the microwave storage structure 16 lies below the electric field at which automatic ignition of a gas discharge is initiated in the gas volume 44.

This preionization radiation source 60 is preferably a laser with two resonator mirrors 62 and 64 and arranged between these is a laser-active medium 66 which is preferably likewise formed by a tube of a gas laser containing correspondingly pumped gas as laser-active medium. This generates a laser beam 68 which is focused by means of a lens 70 through the second resonator mirror 48 and preferably enters the gas volume 44 parallel to the optical axis 50 and thus brings about a preionization of the laser gas in the gas volume 44 along the optical axis 50. The wavelength of the laser beam 60 lies in accordance with the invention in the UV range.

The microwave storage structure 16 of the second embodiment is of exactly the same design as in the first embodiment and so reference is to be had to the statements on the first embodiment with respect to the design and conception of the microwave storage structure 16.

In like manner, the coupling element 14, the microwave line 12 and the microwave source 10 are of identical design and so reference is also to be had in this connection to the statements on the first embodiment.

In a third embodiment of a pulsed gas-discharge laser system according to the invention, illustrated in FIGS. 5 and 6, the microwave storage structure 16 is of the same design as that of the first embodiment.

Furthermore, the coupling element 14, the microwave line 12 and the microwave source 10 are also of the same design as those of the first embodiment. Therefore, reference is to be had in connection with all of these elements to the statements on the first embodiment.

In contrast with the first embodiment, preionization of the laser gas in the gas volume is also carried out in the third embodiment, but not with the preionization radiation source 60 of the second embodiment but with a preionization discharge.

For this purpose two electrodes 72 and 74 are placed on the gas-discharge tube 28, as illustrated, in particular, in FIG. 6, on opposite sides thereof and are connected via leads 76 and 78 to a high-frequency source 80. These electrodes preferably extend over that region of the gas-discharge tube 80 which extends inside the microwave discharge structure 20.

The electric field EV which can be generated by the two electrodes 72 and 74 in the gas volume 44 lies parallel to the vector of the electric field E which is determined by the microwave energy stored in the microwave storage structure 16. This arrangement results in the electric field strength E and the electric field strength EV being superimposed on one another.

By applying a voltage to the electrodes 72 and 74, the electric field EV is added to the electric field E, originating from the microwave energy stored in the microwave storage structure 16, with the result that a gas discharge is ignited in the gas volume 44 although the electric field E, originating from the microwave energy stored in the microwave storage structure 16, lies below the field with which self-ignition of a gas discharge would take place. In this way it is possible, at a defined point in time, correlated with the time behavior of the microwave pulse coming from the microwave source 10 with the microwave power ML, if sufficient microwave energy has been stored in the microwave storage structure 16, to trigger the laser pulse L by applying the voltage to the electrodes 72 and 74.

In a fourth embodiment of a pulsed gas-discharge laser system according to the invention, illustrated in FIG. 7, the microwave storage structure 16 is of the same design as in the first embodiment.

However, in contrast with the second and third embodiments, the preionization does not take place in the region of the gas volume 44 which lies inside the microwave discharge structure 20 but instead in the region of the second end 38. For this purpose, the second end 38 is provided at a spacing from the short-circuit plate 26 with a ring electrode 82 which is connected via a line 84 to an output of a voltage source 86. Another output of the voltage source 86 is connected via a line 88 to the short-circuit plate 26 which with its opening 34 likewise represents a ring electrode so that adjacent to the microwave discharge structure 20 the gas-discharge tube 28 is surrounded by two ring electrodes arranged in spaced relation to one another. Application of a voltage from the voltage source 86 brings about in the region of the second end preionization of the part of the gas volume present in this part of the gas-discharge tube 28 owing to an electric field parallel to the optical axis 50. This preionization is adequate to also ignite in the entire gas volume, in particular, the gas volume 44 lying inside the microwave discharge structure 20, a gas discharge at a field strength which lies below that field strength at which self-ignition of the laser gas would take place.

Hence, in the same way as in the embodiments described hereinabove, microwave energy is first stored in the microwave storage structure 16 and at a desired point in time the gas discharge is ignited in the entire gas volume inside the microwave discharge structure 20 via the preionization discharge between the ring electrode 82 and the short-circuit plate 26 by preionization of the laser gas.

Another possibility for preionization of the laser gas outside the microwave discharge structure 20 is illustrated in FIG. 8 in connection with a fifth embodiment of the pulsed gas-discharge system according to the invention.

In this fifth embodiment, the microwave storage structure 16 is of the same design as in the first embodiment and all other embodiments described hereinabove. Furthermore, the microwave source 10, the microwave line 12 and the coupling element 14 are also of the same design as in the first embodiment. Therefore, reference is to be had in full in connection with all these elements to the statements on the first embodiment.

Preionization of the laser gas in the region of the second end 38 is carried out in such a way that the second end 38, for its part, lies in a coupling waveguide section 90 which is fed via a microwave line 92 and an additional microwave source 94. This coupling waveguide section 90 extends parallel to the optical axis 50 and has a short-circuit plate 96 likewise resting against the short-circuit plate 26, while it passes via a bend 98 into the microwave line 92. The second end 38 emerges in the region of the bend from the coupling waveguide section 90 so that the second Brewster window 42 lies outside of the coupling waveguide section 90 and hence the coupling waveguide section 90 does not disturb the entire radiation path in the resonator formed by the resonator mirrors 46 and 48.

With a microwave pulse generated by the microwave source 94 it is thus possible to generate preionization in the coupling waveguide section 90 which is sufficient to ignite a gas discharge in the entire gas volume 44, in particular, in the part lying inside the microwave discharge structure 20 so that at the respectively desired time the gas discharge can be ignited in the entire gas volume 44 by the microwave pulse from the microwave source 94 in the same way as in the fourth embodiment by the voltage pulse, preferably high-frequency voltage pulse.

In a sixth embodiment, illustrated partially in FIG. 9, the gas-discharge tube 28 is arranged relative to the coupling waveguide 24. In such a way that the optical axis 50 extends perpendicular to the longitudinal axis 30 of the coupling waveguide 24' but also perpendicular to the vector of the electric field which is formed parallel to the Y-direction of the coupling waveguide 24'. In this embodiment, the optical axis 50, therefore, extends parallel to the X-direction of the coupling waveguide 24' and likewise perpendicular to the direction of propagation of an $H_{10}$ wave in the coupling waveguide section 24' which thus runs through the gas-discharge tube 28 standing transversely to it.

In other respects, the sixth embodiment is constructed in exactly the same way as the first embodiment and so reference is to be had in this connection to the statements on the first embodiment and to the description of the individual parts. In contrast with the first embodiment, merely the coupling element 14 together with the microwave storage structure 16 also likewise has to be tuned in such a way that the power coupled back into the microwave line 12 when the laser gas in the gas volume 44 is ignited does not exceed the power ML of the microwave pulse coming from the microwave source 10.

In a seventh embodiment, illustrated in FIG. 10, a microwave source 10 provided in the same way as in the first embodiment feeds a microwave pulse via a microwave line 12 and a coupling element 14 to a microwave storage structure 16'. In contrast with the first embodiment, this microwave storage structure 16' is not designed as an elongate structure closed off by a short-circuit plate but as a ring comprising as microwave discharge structure 20 a coupling waveguide 110 which has at its ends two 90° bends 112 and 114 from which the gas-discharge tube 18 emerges with its two ends 36 and 38. Adjoining these two 90° bends 112 and 114 is a storage waveguide 116 of U-shaped design which additionally comprises as coupling element 14 a power coupler or power combiner. There is also arranged in the storage waveguide 116 an E/H tuning element 118 which serves together with the coupling element 14 to bring about tuning in the entire ring comprised of the storage waveguide 116 and the microwave discharge structure 20' so that a resonant storage of microwave energy can take place in the entire microwave storage structure 16'.

The coupling element 14 has to be tuned together with the microwave storage structure 16' in such a way that also when a gas discharge occurs in the gas-discharge tube 28, the microwave power coupled back into the microwave line 12 does not exceed the power ML of the microwave pulse generated by the microwave source.

In other respects, the seventh embodiment operates as far as the principle is concerned in exactly the same way as the first embodiment, i.e., a microwave pulse is coupled from the microwave source 10 via the microwave line 12 and the coupling element 14 into the microwave storage structure 16, more particularly, in such a way that during the coupling of the pulse, storage of the microwave energy takes place in the microwave storage structure 16 until the laser gas contained in the gas volume 44 of the gas-discharge tube 28 ignites and a laser radiation pulse L builds up owing to the gas discharge in the resonator comprised of the resonator mirrors 46 and 48.

The ignition of the laser gas in the gas volume 44 can take place by self-ignition as in the first embodiment or by all kinds of preionization as described in the embodiments 2 to 5 and so reference is likewise to be had in this connection to the statements on the corresponding embodiments.

In an eighth embodiment of the pulsed gas-discharge laser system according to the invention, illustrated in FIG. 11, a laser pulse is likewise introduced into a microwave storage structure 120 from the microwave source 10 via a microwave line 12, more particularly, likewise by a coupling element 122 which in this case is constituted by a screen with a coupling aperture 124.

The microwave storage structure 120 comprises a storage waveguide 126 which extends adjacent to the coupling element 122 and is followed by an H-T element 128 in the continuation of which a switch waveguide section 130 terminated by a short-circuit plate 122 is arranged.

The H-T element, for its part, comprises a waveguide section 134 which is arranged with the same dimensions as the storage waveguide 126 and coaxially with the latter as well as a bend 136 adjoining a narrow side 140 of the waveguide section 134 parallel to the longitudinal axis 138 of the microwave storage structure 120. Arranged in the continuation of the bend 136 is a coupling waveguide 142 which decreases in its Y-dimension as it extends increasingly away from the bend 136. The coupling waveguide 142 and the bend 136 form a microwave discharge structure 144 designated in its entirety 144 with the gas-discharge tube 28 extending through it. The gas-discharge tube emerges, on the one hand, from an opening 146 in the bend 136 and, on the other hand, from an opening 148 in a short-circuit plate 150 arranged on a side of the coupling waveguide 142 opposite the bend 136.

Both the first end 36 and the second end 38 are terminated, as in the first embodiment, by a first Brewster window 40 and a second Brewster window 42, respectively. Furthermore, the first resonator mirror 46 and the second resonator mirror 48 are arranged in the continuation of the resonator axis 50 extending coaxially with the gas-discharge tube 28.

In this eighth embodiment, the microwave discharge structure 144 is no longer part of the microwave storage structure 120.

With a microwave pulse coupled from the microwave line 12 into the microwave storage structure 120, the microwave energy is stored in a resonant manner in the microwave storage structure 120 extending from the coupling element 122 to the short-circuit plate 132. Here no microwave energy is overcoupled into the bend 136 of the microwave coupling structure 144.

To achieve such overcoupling, a switch 152 which is a triggered or a self-triggered high-pressure or low-pressure gas-discharge switch is arranged in the switch waveguide 130. This switch 152 is designed as a tube 154 with an enclosed gas volume 156. The tube extends with a longitudinal axis 158 parallel to the Y-direction of the switch waveguide 130 and hence parallel to the electric field E in the latter. The switch 152 is arranged at a spacing of a quarter of the waveguide wavelength from the short-circuit plate 132.

The switch 152 is open or switched off when no gas discharge is taking place in the gas volume inside the tube 154 and so the gas volume in the tube 154 has no effect on the standing wave field penetrating the switch waveguide 130. If, however, a gas discharge is ignited in the gas volume inside the tube 154, this also has an effect on the standing wave field propagating in the switch waveguide 130 and displaces it by a quarter of the waveguide wavelength if the switch 152 is spaced from the short-circuit plate 132 by a quarter of the waveguide wavelength.

Ignition of the gas discharge in the gas volume 156 can take place either by the electric field of the stored microwave energy being of such size that it results in self-ignition of the gas discharge or by preionization taking place in the gas volume 156, and this preionization can be carried out in exactly the same way as explained in the embodiments 2 to 5.

Furthermore, the H-T element 128 is arranged in such a way that an opening 160 thereof is decoupled towards the bend 136, also designated gate 3 thereof, when the switch 152 is switched off, i.e., there is no overcoupling of the microwave energy stored in the microwave storage structure 120 out of this opening. When the switch 152 is switched on, i.e., a gas discharge is taking place in the gas volume 156 of the tube 154, this results in a detuning of the microwave storage structure 120 with the standing wave field in the microwave storage structure 120 being displaced by a quarter of the waveguide wavelength so that the stored microwave energy is coupled via the opening 160 into the bend 136 and hence into the microwave coupling structure 144 in which the microwave energy serves to maintain the gas discharge in the gas volume 44.

In the simplest case, provision is made in the eighth embodiment for the gas discharge in the gas volume to take place by self-ignition shortly before the end of the microwave pulse, i.e., the electric field of the coupled microwave energy is of such size at this point in time that the laser gas in the gas volume 156 ignites by itself.

It is, however, also possible to close the switch 152 shortly before the end of the microwave pulse by preionization in the gas volume 156 in the same way as in the embodiments 2 to 5.

To achieve as uniform a decrease as possible of the electric field strength in the coupled microwave energy in the microwave coupling structure 144, the coupling waveguide 142 is designed so as to taper in the Y-direction as it extends increasingly from the bend 136 to the short-circuit plate 150 so that an electric field strength decreasing in this direction is taken into account.

In a ninth embodiment, illustrated in FIG. 12, a microwave pulse is likewise coupled from the microwave source 10 via a microwave line 12 and a coupling element 122 which is likewise formed by a screen with a coupling aperture 124 into a microwave storage structure 120'. This microwave storage structure 120' comprises a first storage waveguide section 170 adjoining the coupling aperture 122, a bend 172 adjoining the storage waveguide section 170, a central storage waveguide section 174, a bend 176 following the latter, a second storage waveguide section 178 and arranged adjacent to the latter a switch waveguide 180 which is terminated by a short-circuit plate 182. In the same way as in the switch waveguides 130, a switch 184 which is likewise designed and switchable in the same way as the switch 152 is arranged in the switch waveguide 180.

Furthermore, several coupling slots 186 for coupling a microwave coupling structure 144' to the microwave storage structure 120' are arranged in the central storage waveguide section 174. This microwave coupling structure 144' is formed by a waveguide section 188 of straight orientation which is terminated at the ends by two short-circuit plates 190 and 192 and can be coupled via the coupling slots 186 to the microwave storage structure 120'.

The spacing between the coupling slots 186 is selected such that it is half of the waveguide wavelength and, furthermore, the coupling slots are arranged in such a way that there is no coupling of microwave energy from the microwave storage structure 120' into the microwave coupling structure 144' when the switch 184 is open.

Only on closing the switch 184 is the standing wave field in the microwave storage structure 120 displaced by a quarter of the waveguide wavelength, whereby the energy is coupled from the microwave storage structure 120' into the microwave coupling structure 144'.

The microwave coupling structure 144' is likewise penetrated by the gas-discharge tube 28 which protrudes through openings 194 and 196 in the short-circuit plates 190 and 192 with a first end 36 and a second end 38, respectively, beyond the microwave coupling structure 144'. The two ends 36, 38 are provided in a manner already described in detail with Brewster windows 40 and 42, respectively, whose resonator mirrors 46 and 48, respectively are arranged facing one another.

With a microwave pulse coupled from the microwave source 10 via the microwave line 12, in the same way as in the eighth embodiment, the energy of this microwave pulse is stored in the microwave storage structure 120'. The switch 184 is closed shortly before the end of the microwave pulse so that there is a sudden coupling of microwave energy from the microwave storage structure 120' into the microwave coupling structure 144' and, consequently, a gas discharge in the gas volume 44 of the gas-discharge tube 28 can be maintained there with this microwave energy.

To ignite the gas discharge, in the same way as in the eighth embodiment, either preionization can be provided or the gas discharge can be initiated by self-ignition.

Furthermore, in the eighth and ninth embodiments, there is also the possibility of already achieving slight overcoupling into the microwave coupling structure 144 or 144' by slight displacement of the standing wave field in the microwave storage structure 120 or 120' and of thereby obtaining an "electric leakage field" with which preionization can take place in the gas volume 44 insofar as this lies in the microwave coupling structure 144 or 144'. After the switch 152 or 184 is switched on, the entire energy stored in the microwave storage structure 120 or 120' is then coupled into the microwave coupling structure 144 or 144' so that the gas discharge then ignites and is maintained by the coupled microwave energy.

We claim:

1. A pulsed excimer laser system, comprising:
   a resonator;
   a gas volume filled with laser gas in which a gas discharge is ignitable;
   a microwave discharge structure at least partially surrounding the gas volume for maintaining the gas discharge;
   a microwave source for generating a microwave pulse;
   a microwave line leading from the microwave source to the microwave discharge structure via a coupling element; and
   a resonant microwave storage structure which communicates with the gas volume and includes at least a partial section extending between the microwave discharge structure and the microwave line;
   wherein the microwave storage structure stores the energy from the microwave pulse emitted by the microwave source until the ignition of the gas discharge and then maintains the gas discharge using the stored energy.

2. The system of claim 1, wherein
   the resonant microwave storage structure is coupled to the microwave line by the coupling element; and
   after the ignition of the gas discharge the resonant microwave storage structure couples back into the microwave line a microwave power which is at most double the microwave power of the microwave pulse.

3. The system of claim 1 wherein the microwaves in the microwave discharge structure have an electric field vector (E) which is perpendicular to an optical axis of the resonator.

4. The system of claim 3 wherein the electric field vector (E) penetrates a region of the gas volume in the microwave discharge structure which extends in the direction of an optical axis of the resonator at least 1.5 times the cut-off wavelength of the microwave discharge structure.

5. The system of claim 1 wherein the resonant microwave storage structure has a length which is approximately half of the path travelled by the microwaves during the gas discharge.

6. The system of claim 1 wherein the resonant microwave storage structure is formed substantially of electrically conductive materials.

7. The system of claim 1 wherein:
   the resonant microwave storage structure comprises a storage line and is integrally formed with the microwave discharge structure.

8. The system of claim 1 wherein the resonant microwave storage structure comprises an elongate resonant structure.

9. The system of claim 1 wherein the resonant microwave storage structure comprises a closed ring-resonant structure.

10. The system of claim 1 wherein the gas discharge is ignited in the gas volume by self-ignition.

11. The system of claim 1 wherein the gas discharge is ignited by preionization.

12. The system of claim 11 wherein the preionization is effected by an electric field (EV).

13. The system of claim 12 wherein the electric field is a high-frequency field.

14. The system of claim 11 wherein the preionization is effected by electromagnetic radiation.

15. The system of claim 14 wherein the preionization is effected optically.

16. The system of claim 1 wherein:
   the resonant microwave storage structure comprises a storage waveguide which is coupled to the microwave line; and
   said resonant microwave storage structure is coupled to the microwave discharge structure via a switch element.

17. The system of claim 16 wherein when the switch element is switched on, the storage waveguide and the microwave coupling structure are tuned to one another such that the storage waveguide couples back into the microwave line a microwave power which is at most double the microwave power of the microwave pulse.

18. The system of claim 16 wherein the switch element comprises an H-T element.

19. The system of claim 16 wherein the microwave discharge structure has a shape which promotes an essentially constant electric field (E) in the gas volume.

* * * * *